United States Patent [19]

Aylward

[11] Patent Number: 4,665,141

[45] Date of Patent: May 12, 1987

[54] PROCESS FOR POLYMERIZING A MONOMER

[75] Inventor: David E. Aylward, Madison, N.J.

[73] Assignee: Cities Service Oil & Gas Corp., Tulsa, Okla.

[21] Appl. No.: 715,670

[22] Filed: Mar. 25, 1985

Related U.S. Application Data

[60] Continuation-in-part of Ser. No. 566,539, Dec. 29, 1983, abandoned, which is a division of Ser. No. 444,296, Nov. 24, 1982, Pat. No. 4,435,520.

[51] Int. Cl.$^4$ .......................... C08F 2/34; C08F 10/02
[52] U.S. Cl. .......................... 526/86; 526/87; 526/88; 526/97; 526/119; 526/124; 526/901
[58] Field of Search ...................... 526/87, 88, 97, 121, 526/124, 129, 119, 86

[56] References Cited

U.S. PATENT DOCUMENTS

| | | | |
|---|---|---|---|
| 3,202,645 | 8/1965 | Yancey | 526/97 |
| 3,718,636 | 2/1973 | Stevens et al. | 526/97 |
| 3,787,384 | 1/1974 | Stevens et al. | 526/129 |
| 3,790,550 | 2/1974 | Miller | 526/901 |
| 3,925,338 | 12/1975 | Ort | 526/97 |
| 4,232,140 | 11/1980 | Ort | 526/124 |
| 4,383,095 | 5/1983 | Goeke et al. | 526/88 |
| 4,397,762 | 8/1983 | Johnston | 526/124 |
| 4,435,520 | 3/1984 | Aylward | 526/119 |

Primary Examiner—Edward J. Smith

Attorney, Agent, or Firm—John Wade Carpenter

[57] ABSTRACT

Process of polymerizing a monomer charge including ethylene by (1) drying an inorganic oxide having surface hydroxyl groups to form a support that is substantially free of adsorbed water, (2) reacting the surface hydroxyl groups of the support with at least about 0.5 mol, per mol of surface hydroxyl groups, of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than 3−x, (3) reacting the thus-treated support with at least about 0.001 molar proportion, per mol of organometallic compound, of a vanadium component consisting essentially of a mixture of about 10–90 mol percent of $VOCl_3$ and, correspondingly, about 90–10 mol percent of $VCl_4$, (4) feeding the product into a gas-phase reaction zone, (5) feeding a trialkylaluminum into the gas-phase reaction zone in order to form a bed comprising the product and the trialkylaluminum, (6) fluidizing the bed with a gas mixture comprising ethylene-hydrogen and chloroform, (7) removing polymerized substantially ethylene particles from the reaction zone, and (8) recycling unreacted gas mixture from the top of the reaction zone to the bottom of the reaction zone.

59 Claims, No Drawings

PROCESS FOR POLYMERIZING A MONOMER

This is a continuation-in-part application of my co-pending application filed on Dec. 29, 1983 and having U.S. Ser. No. 566,539, now abandoned. My co-pending application was a divisional application of an application which had U.S. Ser. No. 444,296 and a filing date of Nov. 24, 1982 and now U.S. Pat. No. 4,435,520.

BACKGROUND OF THE INVENTION

1. Field of the Invention

This invention relates to the polymerization of olefins. More particularly, this invention relates to a process having catalyst compositions which are useful for polymerizing one or more monomers comprising ethylene to polymers having an intermediate molecular weight distribution and a good balance of physical properties.

2. Description of the Prior Art

It is known that catalysts of the type variously described as coordination, Ziegler, Ziegler-type, or Ziegler-Natta catalysts are useful for the polymerization of olefins under moderate conditions of temperature and pressure. It is also known that the properties of the polymers obtainable by the use of such catalysts, as well as the relative economies of the processes used to prepare the polymers, vary with several factors, including the choice of the particular monomers, catalyst components, polymerization adjuvants, and other polymerization conditions employed.

During the years since Ziegler catalysts were first publicly disclosed, there has been a considerable amount of research conducted on the use of such catalysts; and numerous publications have resulted from that research. These publications have added much to the knowledge of how to make various types of olefin polymers by various types of processes. However, as is apparent from the amount of research on Ziegler catalysis that is still being conducted throughout the world, as well as the number of patents that are still being issued to inventors working in the field of Ziegler catalysis, the means of attaining certain results when polymerizing olefins with Ziegler catalysts are still frequently unpredictable. The fact that this situation exists is sometimes due to the need to obtain a previously-unattainable combination of results; occasionally due to difficulties in obtaining the same results in a commercial-scale apparatus as in a laboratory-scale reactor; and often due to a polymerization parameter's having an effect, or side-effect, in a given type of polymerization process that is different from effects achieved by its use in prior art processes of a different type.

One aspect of Ziegler catalysis in which the need for further research has been found to exist has been in the field of preparing ethylene polymers having an intermediate molecular weight distribution and a good balance of physical properties. Such polymers have particular application in the production of sheets and certain articles that are formed by blow molding, e.g., containers for milk, and—like other polymers intended for commercial use—are desirably prepared by a process which is as economical as possible as well as being capable of producing a polymer having the desired properties.

There are, of course, known processes for preparing resins having an intermediate molecular weight distribution by polymerizing ethylene with the aid of Ziegler catalysts. However, the known processes typically suffer one or more of the disadvantages of lack of economy, inability to produce polymers having a suitable balance of properties, and/or unreliability in producing such polymers—particularly in commercial-scale operations. The processes described in Monsanto's British Pat. No. 1,489,410 are among such processes. Actually, from the teachings of the patent and what can be learned from repeating its examples, it is apparent that Monsanto's processes were designed for the preparation of blow-molding resins having broader molecular weight distributions than are desired for many blow-molding resins. However, with the use of technology not taught by Monsanto, the processes can sometimes be manipulated to produce resins having intermediate molecular weight distribution as well, and they appear to be better than many known processes for preparing blow-molding ethylene polymers in some respects, e.g. in their use of supported Ziegler catalysts having a vanadium component and in their ability to produce polymers having desirable properties in laboratory-scale operations. It has been found, however, that they are unreliable in producing polymers having intermediate molecular weight distributions.

Attempts to make Monsanto's processes more reliable in producing polymers having suitable and predictable intermediate molecular weight distributions have heretofore been unsuccessful. Polymers having a variety of molecular weight distributions ranging from broad to narrow have been produced by modifying Monsanto's teachings in various ways, but a "tunable" variable, i.e., a component that can be varied in a substantially linear way so as to permit the production of polymers having a predictable variety of intermediate molecular weight distribution has not previously been discovered.

U.S. Pat. No. 4,003,712 by Miller teaches a gas-phase fluidized bed system and process which are capable of being scaled up to commercial size and, being solvent-free, would be less expensive than processes which use solvents or liquid diluents. However, Miller's silyl chromate catalyst does not give polymers of the desired molecular weight distribution and good balance of physical properties. His system contains some features which tend to shorten commercial "on-stream" time. He does not teach how to avoid polymer buildup on reactor surfaces, a phenomenon variously referred to as "coating", "fouling", or "sheeting".

U.S. Pat. No. 3,202,645 to Yancey presents a process for polymerizing and copolymerizing alpha mono and di-olefins by a catalyst composition comprising (a) the product of the reaction between a compound of a metal chosen from the group consisting of the metals of Group IIb and IIIb (where the group numbers correspond to the Mendeleev Periodic Table) and hydroxyl groups on the surface of a finely-divided particulate inorganic solid, preferably finely-divided silica or alumina, and (b) a halide-type compound of a Group IVa, V, VIa, VIIa, or period 4 of Group VIII metal. The polymerization or copolymerization reaction can be effected at suitable temperatures within the range of from about $-25°$ C. to about $250°$ C., and pressures ranging from below atmospheric upwardly to any desired maximum pressure, for example, 30,000 p.s.i.g. or even higher pressures. U.S. Pat. No. 3,718,636 to Stevens et al teaches obtaining polyolefins having a wide distribution of molecular weights through the use of a catalyst comprising an organometallic compound, and a solid complex component obtained by reacting a solid bivalent metal compound with an impregnation agent which consists of an organometallic compound, separating the solid reaction product, and reacting the solid reaction product with a halogenated derivative of a transition metal. Stevens et al teaches in U.S. Pat. No. 3,787,384 another catalyst suitable for use in olefin polymerization and olefin copolymerization which comprises (a) at least one organometallic compound, and (b) a solid catalytic component obtained by reacting a support composed of silica, alumina or both silica and alumina with a compound of the formula $MR_nX_{m-n}$ in which M is aluminum or magnesium, R is a hydrocarbon radical containing 1 to 20 carbon atoms, X is hydrogen or a halogen, m is the valence of M, and n is a whole number not less than 1 nor greater than m, separating the solid product of the reaction, reacting said product with an excess of a halogen-containing transition metal compound, and separating the solid reaction product. U.S. Pat. No. 3,925,338 to Ort teaches that control of particle size of olefin polymers produced by gas-phase polymerization of at least one olefin using Ziegler-type catalysts deposited on solid supports in a fluidized-solids operation is effected by controlling the particle size of the catalyst support. U.S. Pat. No. 4,232,140 also to Ort discloses the use of trichlorofluoromethane as a promoter in the polymerization and copolymerization of ethylene with supported Ziegler-type vanadium compound/alkylaluminum compound catalysts in the presence of hydrogen. Ort finds that polymer yields with his supported vanadium-based catalysts are too low for commercial viability unless the catalyst is promoted to high yield with the trichlorofluoromethane promoter. Ort does not teach or suggest how to avoid reactor fouling.

U.S. Pat. No. 4,397,762 to Johnstone teaches a supported Ziegler catalyst prepared by the following steps, carried out under anhydrous conditions:

(a) reacting a hydroxyl groups-containing support material comprising magnesium silicate or silica and magnesia with one or more organo-metallic compounds having the general formula $MR^1_aQ_{b-a}$ wherein M is a metal which is aluminum, boron, lithium, zinc or magnesium, $R^1$ is a hydrocarbyl group, Q is halogen or an oxyhydrocarbyl group, b is the valency of M and a is an integer from 1 to b, (b) removing unreacted organometallic compound, if any, from the produced solid material, (c) impregnating the solid material obtained from step (b) with one or more halogen-containing transition metal compounds wherein the transition metal(s) comprise titanium, vanadium or zirconium.

What is still needed is a process employing a catalyst which (a) is suitable for use in a gas-phase polymerization process, (b) has sufficient activity to be economically attractive, (c) contains a tunable variable that permits the production of ethylene polymers having predictable intermediate molecular weight distributions and a good balance of physical properties, (d) does not cause reactor wall fouling, and (e) a gas-phase fluidized bed process which allows the catalyst to perform at its full potential at commercial scale.

SUMMARY OF THE INVENTION

An object of the invention is to provide an economical commercial polymerization process for preparing ethylene polymers having an intermediate molecular weight distribution and a good balance of physical properties.

Another object is to provide non-fouling catalyst compositions which are useful in an economical gas-phase process for polymerizing one or more monomers comprising ethylene and which have a tunable variable permitting the production of polymers having a good balance of physical properties and predictable intermediate molecular weight distributions.

The foregoing objects of this invention are broadly accomplished by providing a process of polymerizing a monomer charge including ethylene comprising the steps of:

(a) drying an inorganic oxide having surface hydroxyl groups to form a support that is substantially free of adsorbed water;

(b) reacting the surface hydroxyl groups of the support with at least about 0.5 mol, per mol of surface hydroxyl groups, of at least one organometallic compound corresponding to the formula $R_xMR'_yR''_z$, wherein M is a metal of Group III of the periodic table, R is a alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$;

(c) reacting the thus-treated support with at least about 0.001 molar proportion, per mol of organometallic compound, of a vanadium component consisting essentially of a mixture of about 10–90 mol percent of $VOCl_3$ and, correspondingly, about 90–10 mol percent of $VCl_4$;

(d) feeding the product of step (c) into a gas-phase reaction zone;

(e) feeding, separately and independently of the feeding step (d), a trialkylaluminum into the gas-phase reaction zone in order to form a bed in the gas-phase reaction zone which comprises the product of step (d) and the trialkylaluminum;

(f) fluidizing the bed of step (e) at a pressure of between about 0.7 and 4.2 MPa and a temperature of between about 50° to 120° C. by diffusing underneath the bed of step (e) a gas mixture comprising ethylene, hydrogen, and chloroform at a rate sufficient enough to give a linear gas velocity in the bed of step (e) of between about 15 to 60 cm/sec;

(g) removing particulate polymerized substantially ethylene particles from the reaction zone; and (h) recycling unreacted gas mixture of step (f) from the top of the reaction zone to the bottom of the reaction zone.

DETAILED DESCRIPTION OF THE INVENTION

This invention is a novel process of polymerizing a monomer charge having ethylene. An inorganic oxide with surface hydroxyl groups is dried to form a support that is substantially free of adsorbed water. The surface hydroxyl groups of the support are reacted with at least about 0.5 mol, per mol of surface hydroxyl groups, of at least one organometallic compound corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$. The thus-treated support is reacted with at least about 0.001 molar proportion, per mol of organometallic compound, of a vanadium component consisting essentially of a mixture of about 10–90 mol percent of $VOCl_3$ and, correspondingly, about 90–10 mol percent of $VCl_4$, in order to form a catalyst product. The catalyst product is fed into a gas-phase reaction zone. Separately and independently of this feeding, a trialkylaluminum is fed into the gas-phase reaction zone in order to form a bed in the gas-phase reaction zone which includes inter alia the catalyst product and the trialkylaluminum. The bed is fluidized at a pressure of between about 0.7 and 4.2 MPa and a temperature of between about 50° to 120° C. by diffusing underneath the bed including the catalyst product and trialkylaluminum a gas mixture comprising ethylene, hydrogen, and chloroform at a rate sufficient enough to give a linear gas velocity in the catalyst product-trialkylaluminum bed of between about 15 to 60 cm/sec. Particulate polymerized substantially ethylene particles are removed from the reaction zone, and the unreacted gas mixture of ethylene, hydrogen and chloroform is recycled from the top of the reaction zone to the bottom of the reaction zone.

The inorganic oxide used in preparing catalyst compositions of the invention may be any particulate inorganic oxide or mixed oxide, e.g., silica, alumina, silica-alumina, magnesia, zirconia, thoria, titania, etc., having surface hydroxyl groups capable of reacting with the organometallic compound. However, it is generally an inorganic oxide selected from the group consisting of silica, alumina, magnesia and mixtures thereof, i.e., physical mixtures, such as mixtures of silica and alumina particles, etc., and/or chemical mixtures, such as magnesium silicate, aluminum silicate, etc. The surface hydroxyl groups may be at the outer surface of the oxide particles or at the surfaces of pores in the particles, the only requirement in this regard being that they be available for reaction with the organometallic compound.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as sometimes affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inorganic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1000 square meters per gram, preferably about 100 to 400 square meters per gram; and a pore volume of about 0.5 to 3.5 cc per gram, preferably about 0.5 to 2 cc per gram.

As indicated above, the organometallic compound that is reacted with the surface hydroxyl groups of the inorganic oxide in the practice of the invention may be any one or more organometallic compounds corresponding to the formula $R_xMR'_yR''_z$, wherein M is a metal of Group III of the periodic table, R is an alkyl group containing 1 to 12 carbon atoms, R' and R'' are independently selected from the group consisting of H, Cl, and alkyl and alkoxy groups containing 1 to 12 carbon atoms, x has a value of 1 to 3, and y and z both represent values of 0 to 2, the sum of which is not greater than $3-x$. Thus, M may be, e.g. aluminum, gallium, indium, or thallium; R may be, e.g., methyl, ethyl, propyl, isopropyl, n-butyl, n-pentyl, isopentyl, t-pentyl, hexyl, 2-methylpentyl, heptyl, octyl, 2-ethylhexyl, nonyl, decyl, dodecyl, etc; R', when present, may be H, Cl, an alkyl group, such as one of those exemplified above for R, which is the same as or different from R, or an alkoxy group, such as the alkoxy groups corresponding to the aformentioned alkyl groups; and R'', when present, may be any of the substituents mentioned above as exemplary of R' and may be the same as or different from R'.

The preferred organometallic compounds are those in which M is aluminum. Utilizable aluminum compounds include chlorides, such as dimethylaluminum chloride, diethylaluminum chloride, dipropylaluminum chloride, diisobutylaluminum chloride, the corresponding alkylaluminum dichlorides, etc., and mixtures of such chlorides, but the chlorides are generally not particularly preferred because of the halogen residue they contribute to polymers made in their presence. The more preferred aluminum compounds are the trialkylaluminums, dialkylaluminum hydrides, dialkylaluminum alkoxides, and alkylaluminum dialkoxides, such as trimethylaluminum, triethylaluminum, tripropylaluminum, tributylaluminum, triisobutylaluminum, isoprenylaluminum, trihexylaluminum, trioctylaluminum, tridecylaluminum, tridodecylaluminum, etc.; the corresponding alkoxy compounds wherein one or two of the alkyl groups have been replaced by alkoxy groups, such as ethylaluminum diethoxide, diethylaluminum ethoxide, ethylaluminum sesquiethoxide, ethylaluminum diisopropoxide, etc.; diethylaluminum hydride, di-n-propylaluminum hydride, diisobutylaluminum hydride, etc.; and mixtures of such compounds. Especially preferred aluminum compounds are the trialkylaluminums, particularly triethylaluminum and tri-n-hexylaluminum, which are advantageous to employ because of their cost, availability, and/or effectiveness.

The amount of organometallic compound employed is at least about 0.5 mol per mol of surface, hydroxyl groups on the inorganic oxide. There is no maxiumum to the amount of organometallic compound that may be employed, since (1) any amount in excess of the amount capable of reacting with the surface hydroxyl groups can be removed from the catalyst compositions in any instance wherein the presence of unreacted organometallic compound might have a detrimental effect on a polymerization process in which one of the catalyst compositions is to be used and (2) it is sometimes desirable to use excess organometallic compound in order to ensure complete reaction of the surface hydroxyl groups therewith. In general, the amount of organometallic compound reacted with the inorganic oxide varies with the molecular weight distribution desired for polymers to be prepared in the presence of the catalyst compositions—smaller amounts of organometallic compound being utilized when broader molecular weight distributions are desired, and larger amounts, i.e., at least one mol per mol of surface hydroxyl groups, being employed when narrower molecular weight distributions are desired.

When the number of available hydroxyl groups on the particular inorganic oxide being treated is not known, it can be determined by any conventional technique, e.g., by reacting an aliquot of the inorganic oxide with excess triethylaluminum and determining the amount of evolved ethane. Once the number of available hydroxyl groups on the inorganic oxide is known, the amount of organometallic compound to be employed is chosen so as to provide the desired molar ratio of organometallic compound to available hydroxyl groups.

As mentioned above, the vanadium component of the catalyst compositions of the invention consists essentially of a mixture of about 10–90 mol percent of $VOCl_3$ and, correspondingly, about 90–10 mol percent of $VCl_4$. It is this component that is the tunable variable of the catalyst compositions, and it is tuned to permit the formation of polymers having the desired intermediate molecular weight distribution by varying the proportions of its constituents--the largest permissable proportion of $VOCl_3$ being employed when the broadest intermediate molecular weight distributions are desired, and this proportion being gradually decreased to effect a gradual narrowing of polymer molecular weight distributions. The most preferable proportionation of the vanadium component constituents varies, of course, with the particular polymer molecular weight distribution desired. However, the vanadium components containing at least 40 mol percent of $VCl_4$ are of particular interest in their ability to be used to prepare polymers having intermediate molecular weight distributions that have previously been the most difficult to obtain.

The amount of vanadium component employed in the practice of the invention may be varied considerably but is generally such as to provide at least about 0.001 molar proportion of vanadium component per mol of organometallic compound. When the catalyst composition is to be prepared by the preferred process described below, wherein no washing step is utilized during or after preparation of the compositions, the amount of vanadium component employed should not be substantially in excess of the amount capable of reacting with the treated support, i.e., about one molar proportion of vanadium compound per mol of organometallic compound. Use of a greater amount would serve no practical purpose and could be disadvantageous in that the excess vanadium component could lead to fouling of the polymerization reactor. However, a larger amount of vanadium component may be employed when fouling of the reactor is not expected to be a problem and/or excess vanadium component will be removed from the catalyst composition before the composition is used. In the practice of the invention, the amount of vanadium component employed is generally not in excess of about 3 molar proportions per mol of organometallic compound; and excellant results are obtained by the use of about 0.03 to 0.2 molar proportion of vanadium compound per mol of organometallic compound, i.e., about 5 to 30 mols of organometallic compound per molar proportion of vanadium component.

As indicated above, the catalyst compositions of the invention are prepared by drying the inorganic oxide, reacting the dried inorganic oxide with the organometallic compound, and reacting the thus-treated support with the vanadium component. The conditions under which the inorganic oxide are dried are not critical as long as they are adequate to provide an inorganic oxide that has surface hydroxyl groups and is substantially free of adsorbed water. However, it is ordinarily preferred to dry the inorganic oxide at about 100° to 1000° C., with or without a nitrogen or other inert gas purge, until substantially all adsorbed water is removed. Also, although improved results are obtained by the use of the catalyst compositions of the invention, regardless of the particular temperature at which the inorganic oxide is dried, the drying temperature has been found to have a negligible-to-noticeable effect on those results—optimum results generally being obtained when the inorganic oxide has been dried at about 200°–600° C. The time required for drying of the inorganic oxide varies, of course, with the particular drying temperature used but is usually in the range of about 5–16 hours.

When the inorganic oxide has been substantially freed of adsorbed water, its surface hydroxyl groups may be reacted with the organometallic compound in any suitable manner, conveniently by (1) adjusting its temperature, if necessary, to the temperature at which the reaction with the organometallic compound is to be conducted, (2) slurrying it in an inert liquid hydrocarbon, generally a $C_4$–$C_8$ hydrocarbon, such as isobutane, pentane, isopentane, hexane, cyclohexane, heptane, isooctane, etc., and mixtures thereof with one another and/or with other materials commonly present in commercial distillation cuts having the desired boiling range, (3) adding the desired amount, usually a substantially stoichiometric amount, of the organometallic compound in neat or solution form, and (4) maintaining the organometallic compound in intimate contact with the inorganic oxide, e.g., by agitating the slurry, for a time sufficient to ensure substantially complete reaction with as many of the available hydroxyl groups as can be reacted with the amount of organometallic compound employed, generally at least about 5 minutes. The reaction may be conducted with or without pressure and at ambient or reflux temperatures, depending on the particular organometallic compound employed, as will be readily understood by those skilled in the art. When the organometallic compound is added in solution form, it is generally preferred, though not required, that the solvent be the same inert liquid hydrocarbon as is already present in the slurry.

The reaction of the vanadium component with the treated support may also be accomplished by conventional means, such as any of the techniques described in British Pat. No. 1,489,410, the teachings of which are incorporated herein by reference. However, it is most desirably accomplished simply by adding the vanadium component in neat or solution form to the slurry of treated support and maintaining it in intimate contact with the treated support for a time sufficient to provide for substantially complete reaction, usually at least about 5 minutes and preferably about 10–60 minutes, although, actually, the reaction is virtually instantaneous. When the amount of vanadium component employed exceeds the amount capable of reacting with the treated support, its constituents must be premixed prior to being added to the treated support in order for the objects of the invention to be attained, but the order of addition of the constituents is immaterial when an excess of vanadium component is not employed. When the amount of vanadium component used in the practice of the invention does not exceed the amount capable of reacting with the treated support, these objects are attained whether its constituents are premixed or sequentially added to the treated support in either order.

When reaction of the vanadium component with the treated support has been accomplished, the resultant catalyst composition may or may not require further treatment to make it suitable for use, depending on the particular process that has been used to prepare the catalyst composition and the particular type of polymerization process in which it is to be used. For example, if the catalyst composition has been prepared by a type of process which results in its being already dry when reaction with the vanadium component has been accomplished, no further treatment is likely to be necessary if the composition is to be used in a gas-phase polymerization process; but slurrying of the composition in in a suitable liquid medium may be desirable if it is to be used in a slurry or solution polymerization process. On the other hand, if the catalyst composition has been prepared by the preferred process described above, i.e., if the inorganic oxide has been slurried in a liquid medium prior to the addition of the other components, it is already suitable for use in a slurry or solution polymerization process but will have to be dried to make it suitable for use in a gas-phase polymerization process. When the composition is to be dried, i.e., freed of any liquid medium used in its preparation, the drying may be achieved by any conventional technique, e.g., filtration, centrifugation, evaporation, blowing with nitrogen, etc. Commerical preparation of the catalyst compositions of this invention is preferably carried out as taught by Rogers in U.S. Pat. No. 4,426,317.

Regardless of the particular technique used to prepare the catalyst compositions of the invention, it should be kept in mind that they are Ziegler catalysts and are therefore susceptible to poisoning by the materials, such as oxygen, water, etc., that are known to reduce or destroy the effectiveness of Ziegler catalysts. Accordingly, they should be prepared, stored, and used under conditions that will permit them to be useful as polymerization catalysts, e.g., by the use of an inert gas atmosphere, such as nitrogen.

The invention is particularly advantageous in that it provides catalyst compositions which (1) have the active ingredients chemically-attached to an inorganic oxide support, (2) have a tunable variable that makes them capable of producing ethylene polymers having predictable intermediate molecular weight distributions, and a good balance of physical properties by an economical gas-phase process that gives a high yield of polymer and (3) do not foul gas phase reactors. The fact that high yields of polymer can be obtained by the use of the catalyst compositions is particularly unexpected in that these high yields are attainable even when the catalyst compositions are prepared by the preferred process wherein no washing step is required or utilized during or after preparation of the compositions. Both experience in the field and the teachings of the prior art indicate that at least one washing step should be required in the preparation of such compositions when high yield catalysts are desired.

After the catalyst composition of this invention is prepared, it is subsequently introduced into a gas-phase fluidized reactor similar to that taught by Miller in U.S. Pat. No. 4,003,712 which will be incorporated by reference herein. In a preferred embodiment of the invention, the diameter of the velocity reduction or disengaging zone at the top of Miller's reactor is enlarged and the cyclone and filter in the gas recycle system are eliminated for stable, long-term commercial operation. It should be understood that polymerization with the catalyst composition of this invention may be conducted in any fluidized system which has a distribution plate means and allows a monomer gas to fluidize a bed including the catalyst compositions; allows unreacted monomer gas to be recycled from the top of the fluidized system back to the bottom of the fluidized system or for admixing with the monomer gas prior to its diffusing or passing through the fluidized bed; allows a polymer product to be withdrawn from the fluidized bed; allows catalyst and a trialkylaluminum to be added to the fluidized bed; and provides for the removal of the heat of polymerization. Size, shape, pressure rating, heat removal capability, and other factors can limit the polymer production capacity of the gas-phase fluidized-bed reaction systems of this invention. The process of this invention may be practiced in commercial facilities having production capacities of 50,000 to 250,000 metric tons per year or more. The process of this invention may also be practiced in laboratory scale reactors having a poduction capacity of from about 0.1 to 1.0 kg/hr or in pilot plant reactors having production capacities of from 5 to 500 kg/hr.

The catalyst composition of this invention should preferably be injected or fed to the fluidized bed system at a point between the distribution plate and about ⅛ of the height of the fluidized bed from the distribution plate of the reactor. More preferably, the catalyst composition is fed into the fluidized bed system at a point of between about ⅛ to about ½ of the height of the fluidized bed. Injection of the catalyst composition above about ⅛ of the height of the bed (as opposed to below ⅛ of the height) offers distribution of the catalyst compositions throughout the entire ongoing fluidized bed to retard and/or preclude the formation of localized spots of high catalyst composition concentration which would result in the formation of "hot spots" at or near the distribution plate. A "hot spot" is a localized region in which the exothermic heat of polymerization is not dissipated before some polymer heats to the softening point of the polymer. Any introduction of the catalyst compositions of this invention at a point above about ⅛ of the height of the fluidized bed from the distribution plate of the reactor may lead to excessive carryover of the fresh catalyst of this invention into the gas recycle system. The rate of injection or rate of feed of the catalyst composition of this invention is any suitable rate which is equal to catalyst consumption in the polymerization process of this invention and generally depends on the size of the fluidized bed system. The rate of production of the particulate polymerized substantially ethylene particles in the fluidized bed is partly determined by the rate of catalyst injection.

I have found that the rate of injection of the catalyst for my polymerization process is generally preferably at a rate that maintains the concentration of the vanadium in the fluidized bed between about 1/10 ppm to about 50 ppm based on weight of vanadium metal divided by total solids in the bed. More preferably, the rate of injection of the catalyst is that which would maintain the concentration of vanadium in the fluidized bed between about 0.50 ppm to about 10 ppm; most preferably, between about 1 ppm to about 4 ppm the fluidized bed is substantially particulate polymerized ethylene polymer particles formed by polymerization of the monomer(s) on the catalyst compositions of this invention.

In order for the catalyst compositions of this invention to give high yield of polymer product per unit of vanadium component, I have discovered that it is necessary to add or inject at least one trialkylaluminum compound into the fluidized bed system as a co-catalyst. For a variety of reasons, it is preferred to add the trialkylaluminum compound, or the mixture of trialkylaluminum compounds, that is being used as co-catalyst directly to the fluidized bed separately and independently of the catalyst and at an injection point removed from the catalyst injection point. However, the process of this invention does not depend on the method of feeding the trialkylaluminum co-catalyst or the location of its injection point. The trialkylaluminum compounds of this invention may be fed to the fluidized bed as pure compounds, or in solution in a liquid hydrocarbon which will vaporize in the fluidized bed. Suitable hydrocarbon solvent include, but are not limited to, isobutane, isopentane, hexane, heptane, and mixtures thereof.

The trialkylaluminum of this invention may be any trialkylaluminum wherein the alkyl or combination of alkyl groups contain between 1 and about 36 carbon atoms. In a preferred embodiment of the invention, the alkyl group or combination of alkyl groups contain between 1 and about 12 carbon atoms. Suitable trialkylaluminum compounds have been found to include trimethyl-, triethyl-, tri-i-butyl-, tri-n-hexyl-, tri-n-octyl- and ethyl di-i-butylaluminum. It should be understood that trialkylaluminum compounds add ethylene, and alpha olefins to some extent, under the operating temperatures and pressures of the polymerization process of the invention. Thus, an ethyl group on aluminum may be inserted by ethylene to become a butyl group, etc. Therefore, there is no reason to believe or require that all alkyl groups on the aluminum be the same. There is every reason to believe that mixtures of trialkylaluminum compounds are generated during polymerization and are as effective as pure compounds. Since the exact composition of the alkyl groups on aluminum during the polymerization process of this invention is not known because of the ethylene insertion reaction, all of the trialkylaluminum species in the fluidized bed are referred to collectively for the purposes herein as "trialkylaluminum".

As was the case for the catalyst composition of this invention, the rate of injection of the trialkylaluminum is also any suitable rate which is equal to the trialkylaluminum consumption in the polymerization process, and also depends on the size of the fluidized bed system. Polymer productivity from the polymerization process is not only determined by the rate of catalyst injection, but also from the rate of trialkylaluminum injection.

Assuming that the trialkylaluminum compounds of this invention remain in the fluidized bed and assuming uniform distribution of trialkylaluminum throughout the fluidized bed, the molar concentration of trialkylaluminum may be calculated from the molar feed rate of the trialkylaluminum being fed into the fluidized bed reaction system and the withdrawal rate of the polymer product particles. Likewise, assuming uniform distribution of the catalyst composition throughout the fluidized bed, the molar concentration of the vanadium component of the catalyst composition may be calculated from the molar feed rate of the vanadium components of the catalyst composition being fed into the fluidized bed reaction system and the withdrawal rate of the polymer product particles. At stable, lined-out operating conditions, the ratio of the molar concentration of the trialkylaluminum to the molar concentration of the vanadium component in the bed of catalyst composition will asymptote to the ratio of the molar feed rate of the trialkylaluminum to the molar feed rate of the vanadium components of the catalyst composition of this invention. For the catalyst compositions of this invention, the injection rate of the trialkylaluminum should be such that the Al/V ratio in the fluidized bed of the molar concentration of the trialkylaluminum to the molar concentration of the vanadium component is between about 1 to about 5,000. I have found that the activity of the catalyst composition of the invention is maximized in a certain range of trialkylaluminum to vanadium molar ratio. Too little or too much trialkylaluminum suppresses the activity of the catalyst composition and the polymer production. It has been determined that a plot of the trialkylaluminum to vanadium molar ratio versus the catalyst (of this invention) activity possesses a generally flat peak and the optimum trialkylaluminum to vanadium molar ratio lies in the range of from about 2 to about 500, with from about 2 to 60 being the most preferred from the standpoint of minimizing catalyst residue levels in the polymer and trialkylaluminum cost. Therefore, the preferred injection rate of the trialkylaluminum into the fluidized bed system of this invention is that injection rate wherein the molar ratio in the fluidized bed of the molar concentration of the trialkylaluminum to the molar concentration of the vanadium composition is between about 2 to 500, and most preferably from about 2 to about 60.

The bed of particulate polymerized substantially ethylene particles, trialkylaluminum and the catalyst composition of this invention has to be fluidized at a pressure of between about 0.7 and 4.2 MPa and a temperature of between about 50° to 120° C. Fluidization is conducted by diffusing underneath the bed (and through the distribution plate) a gas mixture comprising ethylene, hydrogen and chloroform at a rate sufficient enough to give a linear gas velocity in the bed of between about 15 to about 60 cm/sec. The gas mixture will also include inert gas which is used to feed the catalyst compositions to the fluidized bed. A majority of the gas mixture is in the form of unreacted gas mixture that is recycled from the top of the reaction zone to the bottom of the fluidized bed of the reaction zone.

Although the catalyst compositions and the trialkylaluminum of this invention polymerize ethylene and other olefins over a wide range of temperatures, there is a practical limitation to the temperatures at which the gas-phase fluidized-bed process of this invention is commercially viable. For example, above about 120° C., ethylene polymers soften and tend to agglomerate in a fluidized bed, leading to formation of lumps, loss of fluidization, and onset of an inoperable condition. Below about 50° C., the production rate of commercial reactors becomes so low that the process is no longer profitable. It is generally desirable to operate near the highest temperature at which the polymer will not agglomerate in the bed with a temperature safety factor for small temperature upsets so that inoperable conditions are not encountered even briefly. Therefore, the preferred temperature range is from about 65°–115° C., with the range from about 75°–110° C. being most preferred.

The pressure at which the polymerization process of this invention is conducted is selected on the basis of desired commercial operation rather than upon some limitation of the catalyst. The catalysts of this invention will function at atmospheric, subatmospheric, or superatmospheric pressures. For economy of operation, one wishes to polymerize near the highest pressure for which the equipment is designed in order to maximize the production rate for the equipment. But, because commercial process equipment generally is more expensive with the higher pressure, there is a natural tendency to design commercial equipment for low pressures. These constraints lead to a commercial operating range of about 0.7–4.2 MPa. At the lower pressures, however, higher dwell or residence times in the reactor are required to reach high yields of polymer per unit of catalyst. At the higher pressures, there is little room to safely accommodate pressure upsets. These constraints lead to a preferred pressure range of about 1.6–3.9 MPa.

In order to provide sufficient mixing and agitation in the bed of polymer particles, trialkylaluminum and catalyst that "hot spots" will not develop, it is necessary that the flow rate of the gas mixture through the bed of polymer particles containing traces of the catalyst and the trialkylaluminum be sufficient to fluidize the particles. For the powdered polymer particles produced by the catalyst compositions of this invention, the minimum fluidization velocity, $G_{mf}$, has been determined to be about 15 cm/sec. As gas velocity increases, a point is reached at which the particles are largely swept out of the bed by the force of the rising gas (the transport velocity), which, for the particles of the present invention is about 4 $G_{mf}$, or 60 cm/sec. To provide some margin for operating error, the preferred velocity range is about 1.5–3.0 $G_{mf}$, or about 23–45 cm/sec, in contrast to the 3–5 $G_{mf}$ range preferred by Miller in U.S. Pat. No. 4,003,712 for his catalysts.

The catalysts of this invention, under the commercial conditions described above, in the absence of a chain transfer agent, produce polymer of a molecular weight too high for conventional melt processing. Therefore, in the commercial practice of this invention the fluidizing gas mixture must contain hydrogen during polymerization to adjust the molecular weight (as determined by melt index) to the desired range for the product being produced. This is done by increasing the hydrogen/ethylene ratio to raise melt index (lower molecular weight), or reducing the ratio to produce the opposite effect. The catalyst compositions of this invention are moderately sensitive to hydrogen, so it is generally not necessary to use more than 20% by vol. of hydrogen even to produce the highest melt index polymer. Furthermore, when used as described herein, altering the hydrogen/ethylene ratio to increase melt index does not cause a loss of production rate in a commercial plant within the range of melt indexes used for commercial polymers at this time. Preferably, the amount of hydrogen utilized in a preferred embodiment of the invention in order to control the molecular weight of the produced polymer is between about 0.10% to about 20.0% by volume of the total gas mixture volume.

The gas mixture has to have chloroform in order that the catalyst compositions of this invention can have their activity promoted. While other halogenated carbon compounds such as methylene chloride and fluorotrichloromethane may work as promoters, from the standpoints of promotion of catalyst activity, cost, availability, ease of handling, and catalyst promotion without causing reactor fouling, chloroform is clearly the compound of choice. Only small amounts are needed because of its effectiveness. Under the conditions of polymerization, it is a gas, and generally will be present in the recycle gas at concentrations between about 0.0001 to about 1.000% by vol of the gas mixture. Since the preferred vol % ranges for hydrogen and chloroform are respectively between about 0.10 and about 20.0 and between about 0.0001 and about 1.000 the remaining vol % for any given volume of the gas mixture would include ethylene and any of the inert gas which is used to feed the catalyst compositions to the fluidized bed in the reaction zone. In a preferred embodiment of the invention, ethylene preferably comprises between about 50.0 vol % and about 99.9 vol % of the gas mixture.

It appears that the molar ratio $CHCl_3/V$ is more useful in predicting and understanding its effect than the overall concentration in the gas, since it affects the catalyst's performance. The $CHCl_3/V$ ratio may vary from about 2 to about 5000. Because chloroform is relatively inexpensive and used in small amounts, there is no real economic incentive to minimize its use. However, there appears to be a maximum in the curve of catalyst activity vs. $CHCl_3/V$ ratio, with a broad optimum in the range of about 10–500. There also appears to be an interaction between the optima for $CHCl_3/V$ ratio and Al/V ratio such that lower $CHCl_3/V$ ratios are generally preferred when the Al/V ratio is low, and higher $CHCl_3/V$ ratios are generally preferred when the Al/V is high. Other factors, such as impurity levels, may also cause a shift in the optimum $CHCl_3/V$ ratio or Al/V ratio, but generally such factors will not shift the optima outside the preferred ranges.

I have found that, in order to control the density of the produced ethylene polymer, the gas mixture of ethylene, hydrogen and chloroform may include alpha olefins which will be copolymerized with the ethylene of the gas mixture. Although the catalyst compositions of this invention will copolymerize essentially any alpha olefin with ethylene, there is a practical limit to what can be effectively done in a gas-phase reaction. Generally, olefins having more than 8 carbon atoms have too low a vapor pressure to be used in high enough concentration to have much effect on density. Propylene, butene-1, hexene-1, 4-methylpentene-1, and octene-1 are among the alpha olefins useful in copolymerization with ethylene in this invention. Preferably, mixtures of alpha olefins having 3 to 8 carbon atoms are used in a preferred embodiment of this invention. By this process, polymers generally considered to be HDPE (densities of 0.940 or greater) and LLDPE (densities below 0.940) may be made equally well by adjusting comonomer concentration in the feed or other factors. The amount of comonomer needed is determined by the density of the polymer product being made. Generally, not less than 0.5 vol % of alpha olefin will be used and not more than 30 vol % of the alpha olefin will be utilized for any given volume of the gas mixture along with any of the inert gas and between about 0.10 vol % and about 20.0 vol % of hydrogen, between about 0.0001 vol % and about 1.000 vol % chloroform, and between about 50.0 vol % and about 99.4 vol % ethylene.

The catalyst compositions of this invention are preferably fed to the gas-phase fluidized-bed reactor as a dry particulate matter, such as dry powder, under the inert gas. Any gas that does not react with the catalyst is considered inert. Suitable inert gases include nitrogen, argon, and methane. Any device which can measure and convey a free-flowing powder is suitable for feeding the catalyst, although the device must not allow monomer to enter the catalyst storage area of the feed device. Once the catalyst has been measured and delivered to the catalyst feed line, any good method of conveying it to the fluidized bed may be used. These include mechanical means such as screw conveyers, or gas conveying with inert gas or, as Miller teaches, with recycle gas from the reactor. Catalyst may be added continuously, semi-continuously, or discontinuously to the reactor. Continuous addition is preferred, but is virtually impossible at laboratory scale. Catalyst may be fed pure or may be diluted with any free-flowing particulate material such as pure, dry support or polymer powder from the reactor. In catalyst feeding, all that is really critical is that the catalyst be fed at a controlled rate and be dispersed in the bed before a "hot spot" develops.

The produced particulate polymerized substantially ethylene particles may be removed from the gas-phase reaction zone at any suitable location. Preferably, the produced ethylene polymer particles are removed in accordance with the procedure described by Miller in U.S. Pat. No. 4,003,712. In a preferred embodiment of the invention, the produced ethylene polymer particles are removed from the gas-phase reaction zone above and in proximity to the distribution plate.

As has been mentioned, it is necessary to have good fluidization, good catalyst mixing, and good distribution of gas in the bed in order to avoid "hot spots" which cause lumps to form in the bed. These lumps themselves disturb fluidization so, once a lump forms, the tendancy for other lumps to form is enhanced. Eventually a reactor shut down is necessary because the process becomes inoperable.

Similarly, it is necessary for long-term, stable operation of commercial reactors that the surfaces of the reactor and distribution plate remain clean. If a polymer coating (fouling) builds up on a reactor surface, several undesirable things may happen. First, fouling on the distribution plate tends to perturb the desired gas distribution and restrict the ability to the polymer particles at the plate to move laterally. Both effects tend to produce "hot spots" at or near the distribution plate. Second, fouling on the reactor wall inhibits the normal downward motion of fluidized particles at the wall surface. Particles which "hang up" at a wall surface can generate "hot spots". Third, the wall coating may come loose in places, fall into the bed, and disrupt fluidization as any lump would do. Even worse, wall fouling usually is in the form of a "sheet" rather than a lump, and produces severe gas channelling in the bed if it falls off.

Although poor selection of operating conditions or poor operating techniques may lead to lump formation, it appears that fouling of reactor surfaces depends primarily on the catalyst used. Some catalysts tend to produce fouling, and some do not. At this time, insufficient experience has been gained to be able to predict with accuracy which catalysts will foul and which will give stable operation for months without fouling reactor surfaces. Obviously, for economical commercial operation, the catalyst must not foul reactor surfaces. Fouling in a commercial reactor leads to "down time" with consequent loss of production and extra maintenance cost for cleaning. Thus, fouling will cause a gas-phase fluidized-bed process to lose its economic advantage over slurry processes.

The following examples are given to illustrate the invention and are not intended as a limitation thereof. In these examples, compositions and processes that are illustrative of the invention are distinguished from those that are outside the scope of the invention and are included only for comparative purposes by using an alphabetic designation for any example or run that is a comparative example and a numeric designation for the examples and runs that are illustrative of the invention. Yields given in the examples are measures of productivity in terms of the number of grams of polymer produced per gram of catalyst per hour, melt indices ($MI_2$) are those determined by ASTM test D-1238-65T using a 2160-gram weight, while the NVR values are "normalized" melt viscosity ratios determined by measuring the apparent viscosities of the polymers at 30 $sec^{-1}$ and 300 $sec.^{-1}$, respectively, at 200° C. in an Instron capillary rheometer and (2) normalizing them to $V_{30}=5$ by the equation.

$$NVR = \text{antilog}\, (0.14699 + 0.7897 \log V_{30} - \log V_{300})$$

where $V_{30}$ and $V_{300}$ are the measured apparent viscosities. This normalization permits comparison of the viscosity ratios of polymers having different $V_{30}$ values, since the unnormalized $V_{30}/V_{300}$ ratio is a function of $V_{30}$. The NVR is constant for any given catalyst over an $MI_2$ range of about 1–30, and only slight deviations occur outside of that range.

In the examples, the following procedures are used to prepare the catalyst compositions and polymers.

PREPARATION OF CATALYSTS

In the preparation of each of the catalysts, dry Davison 952 silica gel (a commercial inorganic oxide having a surface area of about 250–350 square meters per gram, a pore volume of about 1.5–1.7 cc per gram, and an average particle size of about 65–75 microns) by heating it under dry, deoxygenated nitrogen for about 16 hours at a temperature of about 225°–275° C. to provide an activated oxide containing about 1.4 mmols of available hydroxyl groups per gram. Cool the activated oxide to ambient temperature under a purified nitrogen blanket, suspend it in commercial hexane, add neat trialkylaluminum, and stir the resultant slurry for about 30 minutes. Then add a vanadium component in neat or solution form, stir the resultant slurry for an additional 30 minutes, allow the hexane and catalyst layers to separate, decant the clear hexane layer, and remove the remaining hexane under a nitrogen purge to produce a powdered catalyst. The particular ingredients used to prepare the catalysts and the amounts of trialkylaluminum and vanadium compounds added per gram of inorganic oxide are shown in the examples and/or tables.

SLURRY POLYMERIZATION

Charge 1.5 liters of dry hexane to a suitable autoclave under a dry, deoxygenated nitrogen atmosphere, add 1.1 cc of a 30% solution of triethylaluminum in heptane as a activator-scavenger, stir, and add a slurry of 0.1–0.4 gram of catalyst powder in, respectively, 1–4 ml of commerical hexane. Raise the temperature of the reactor to 85°–90° C., pressurize the reactor with enough hydrogen to achieve the production of a polymer having the desired melt index, add about 40–100 cc of liquid butene-1 as a comonomer, raise the reactor pressure to about 2.1 MPa with ethylene, and hold the pressure at that level throughout the polymerization by adding ethylene as needed. Immediately after pressurizing the reactor with monomer, add 5 cc of a 0.25% solution of chloroform in hexane as a promoter; and, at 15-minute intervals thereafter, add supplemental 5 cc aliquots of the promoter solution. After 30–60 minutes, stop the polymerization by venting the autoclave, opening the reactor, filtering the polymer from the liquid medium, and drying the polymer.

LABORATORY GAS-PHASE POLYMERIZATION

The laboratory apparatus consisted of a continuous polymerization reaction system essentially as depicted by Miller in the drawing of U.S. Pat. No. 4,003,712, with two exceptions: there was no filter in the gas recycle line, and the catalyst was fed to the reactor with nitrogen only. The reaction zone itself was 10 cm in diameter, 120 cm tall. Recycle gas passed through a velocity reduction or disengaging zone atop the reactor, through a cyclone separator, through a centrifugal compressor, and into the bottom of the reactor where the gas was distributed into the fluidized bed by a dispersion or distribution plate. Heat exchange was effected by circulating presurrized, tempered water through jacketing on the recycle gas piping. This system had a rated capacity of 450 g of polymer per hour. Generally, for catalyst screening studies, the system was operated as follows:

Introduce a stream or streams of ethylene, any comonomer(s), chloroform, and hydrogen to the reactor. Continuously withdraw unreacted or recycle gas from the top of the disengaging zone, pass it through a heat exchanger to maintain a bed temperature of about 95°–100° C., and introduce it at the bottom of the reactor at a rate sufficient to give a superficial velocity of about 25 cm/sec in the bed.

Introduce make-up monomer, chloroform, and hydrogen into the recycle gas line so as to maintain constant gas composition as detected by on-line analyzers and so as to maintain the reactor pressure at about 3.5 MPa and to provide about 40 mmols of chloroform per mmol of vanadium per hour, and feed fresh catalyst particles into the reactor below the top of the bed so as to provide a vanadium feed rate of one mmol per hour. Add triethylaluminum as a scavenger and co-catalyst during the polymerization so as to provide a triethylaluminum feed rate of 20 mmol per hour. Withdraw polymer product semi-continuously from the bottom of the bed at a rate such as to maintain a constant bed level. Take aliquots of withdrawn polymer for testing.

EXAMPLE I

Prepare two catalyst compositions by the catalyst preparation procedure described above. Then use each of the catalyst compositions to prepare an ethylene/butene-1 copolymer by the slurry polymerization procedure described above. The amounts of ingredients employed in the production of the catalyst compositions, and the yields, melt indices, and normalized viscosity ratios (NVR), i.e., molecular weight distributions, of the polymers are shown in Table I.

TABLE I

| RUN # | Catalyst Composition | Yield | MI$_2$ | NVR |
|---|---|---|---|---|
| A | VOCl$_3$/Al(C$_2$H$_5$)$_3$/SiO$_2$ 0.1 mM 0.8 mM 1 g | 200 g | 0.32 | 2.74 |
| B | VCl$_4$/Al(C$_2$H$_5$)$_3$/SiO$_2$ 0.05 mM 0.8 mM 1 g | 1192 g | 1.1 | 2.24 |
| 1 | VCl$_4$ + VOCl$_3$/Al(C$_2$H$_5$)$_3$/SiO$_2$ 0.05 mM 0.05 mM 0.8 mM 1 g | 175 g | 0.36 | 2.45 |

EXAMPLE II

Repeat Example I except for reacting the surface hydroxyl groups of the silica gel with a substantially stoichiometric amount of triethylaluminum in the preparation of each of the catalyst compositions in order to produce higher yields of polymers having narrower molecular weight distributions. The amounts of ingredients employed in the preparation of the catalyst compositions, and the yields, melt indices, and NVR values of the polymers are shown in Table II.

TABLE II

| RUN # | Catalyst Composition | Yield | MI$_2$ | NVR |
|---|---|---|---|---|
| C | VOCl$_3$/Al(C$_2$H$_5$)$_3$/SiO$_2$ 0.1 mM 1.4 mM 1 g | 600 g | 0.62 | 2.57 |
| D | VCl$_4$/Al(C$_2$H$_5$)$_3$/SiO$_2$ 0.05 mM 1.4 mM 1 g | 1716 g | 1.24 | 2.18 |
| 2 | VCl$_4$ + VOCl$_3$/Al(C$_2$H$_5$)$_3$/SiO$_2$ 0.05 mM 0.05 mM 1.4 mM 1 g | 362 g | 27.4 | 2.39 |

EXAMPLE III

Prepare eight ethylene/butene-1 copolymers by the slurry polymerization procedure described above using, as the catalyst compositions, VCl$_4$+VOCl$_3$/Al(C$_2$H$_5$)$_3$/SiO$_2$ compositions which—like the catalyst composition of Example II, Run #2—are prepared by reacting the surface hydroxyl groups of the silica gel with a substantially stoichiometric amount of triethylaluminum but which are produced by the use of the proportions of VCl$_4$ and VOCl$_3$ shown in Table III.

TABLE III

| Run # | Mol % VCl$_4$ | Mol % VOCl$_3$ |
|---|---|---|
| 3 | 10 | 90 |
| 4 | 20 | 80 |
| 5 | 30 | 70 |
| 6 | 40 | 60 |
| 7 | 60 | 40 |
| 8 | 70 | 30 |
| 9 | 80 | 20 |
| 10 | 90 | 10 |

The polymers prepared in Runs 3–6 have NVR values between those shown in Table II for Runs C and #2, while those prepared in Runs 7–10 have NVR values between those shown for Runs #2 and D—the NVR values decreasing substantially linearly as the proportion of VOCl$_3$ in the vanadium component is decreased.

The preceding examples show that the use of a mixture of VCl$_4$ and VOCl$_3$ as the vanadium component of the catalyst composition provides a tunable variable that permits the production, by slurry polymerization, of ethylene/butene-1 copolymers having predictable intermediate molecular weight distributions. The following examples demonstrate the effectiveness of VCl$_4$/VOCl$_3$ mixtures as a tunable variable of catalyst compositions in gas-phase polymerization processes, in copolymerizations of ethylene with other alpha-olefins, and in the homopolymerization of ethylene.

EXAMPLE IV

Repeat Example II and III except for using each of the catalyst compositions to prepare an ethylene/butene-1 copolymer by the laboratory gas-phase polymerization procedure described above. Similar results are observed without reactor fouling, the molecular weight distributions of the polymers being gradually narrowed as the proportion of VCl$_4$ in the vanadium component is gradually increased.

EXAMPLE V

Repeat Example IV except for employing propylene as the comonomer instead of butene-1. Similar results in controlling molecular weight distributions by varying the proportions of VCl$_4$ and VOCl$_3$ are observed without reactor fouling.

EXAMPLE VI

Repeat Example IV except for employing no comonomer in the laboratory gas-phase polymerization processes. Similar results in controlling molecular weight distributions by varying the proportions of VCl$_4$ and VOCl$_3$ are observed without any evidence of reactor fouling.

EXAMPLE E

A batch of catalyst having the composition of the catalyst of run 2 (Table II) is prepared as a dry powder according to Rogers, U.S. Pat. No. 4,426,317, and used in the laboratory gas phase polymerization procedure described above, using ethylene as the only monomer. By adjusting concentrations of hydrogen and chloroform, and feed rates of catalyst and a 3% solution of triethylaluminum co-catalyst in hexane, the reaction and polymer properties stablize after 36 hours of continuous operation to give 350 g/hr of polyethylene product of 0.7 melt index and an NVR of 2.6.

After stability has been reached, the hydrogen feed is discontinued. Gradually, the hydrogen/ethylene ratio drops, as determined by an on-line gas analyzer, as recycle gases are lost from the reaction zone through purge to the instruments and by being removed with the polyethylene product and no fresh hydrogen is added to the make-up gases. As the hydrogen level in the recycle gas decreases, the polymer melt index drops until it is unmeasurably low. The polymerization rate, as determined by ethylene uptake and by product removal from the reaction zone is unchanged, within experimental error. There is no external evidence of fouling. Hydrogen flow is then restarted, and the original hydrogen/ethylene ratio re-established. Within 18 hours, the melt index is again 0.7.

With the reactor restabilized, the chloroform feed is discontinued. Gradually, the CHCl$_3$/V ratio decreases as the CHCl$_3$ (promoter) concentration in the recycle gas becomes lower due to loss of recycle gas from the system and the make-up gas being promoter-free. There is no change in the melt index of the polymer, but the polymerization rate drops to less than 100 g/hr. The chloroform feed is restarted at its original feed rate. Polymerization rate picks up immediately, as judged from an increase in both bed temperature and polymer powder production, and reaches a level of about 550 g/hr, after which the rate declines. About 36 hours after chloroform is readmitted to the reaction, the reactor and polymer are restablized to the original conditions of 350 g/hr rate and 0.7 melt index.

Then the triethylaluminum feed is stopped. The polymerization rate begins to decrease, slowly at first, and then rapidly. When the polymerization rate reaches about 100 g/hr, the triethylaluminum feed is restarted at the original rate. Within an hour, an increase in polymer production can be noted, and within about 24 hours the reaction is restabilized at the original condition.

The reaction is then terminated intentionally, and the reactor opened for inspection. There is no visible coating or fouling on the distribution plate or reactor walls.

EXAMPLE F

A gas-phase fluidized-bed pilot plant polymerization system, similar in design to the previously-described laboratory gas phase system was built. There was no separator in the gas recycle system, however. The reaction zone was 46 cm in diameter and about 3 m tall. The reactor was topped by a disengaging zone of 92 cm diameter. Gas recycle piping led from the disengaging zone through a heat exchanger and recycle gas blower to the bottom of the reactor. A distribution plate at the bottom of the reactor served to disperse or distribute the gas evenly at the bottom of the bed. Gas analyzers monitored the gas composition of the recycle system, and via suitable instrumentation, automatically adjusted flows of feed streams to keep the composition constant. Catalyst was fed directly to the bed with an automatic catalyst feeder using nitrogen as the motive gas to convey the catalyst into the bed. Triethylaluminum (TEA) was pumped directly into the bed. Polymer powder was automatically withdrawn to maintain a constant inventory of powder in the reactor.

A run was carried out at a reaction pressure of about 3.5 MPa, an average bed temperature of about 93 degrees C., and a recycle gas rate of about 4525 kg/hr, to give a gas velocity in the bed of about 30 cm/sec. The catalyst had the composition of run A, Example I, and was made according to U.S. Pat. No. 4,426,317 (Rogers). With a gas composition consisting essentially of about 84% ethylene, more than 6% hydrogen, and more than 9% nitrogen, and with the catalyst, triethylaluminum (neat), and chloroform feed rates stabilized at about 20, about 3, and about 5 cc/hr, respectively, about 11 kg/hr of a broad molecular weight distribution polymer (NVR about 2.7) was produced. Attempts to blow mold milk bottles from the product were unsuccessful because the molecular weight distribution of the polymer was too broad for use in conventional milk bottle fabricating equipment.

EXAMPLE VII

When the catalyst of Example E is substituted "on the fly" following collection of the sample of Example F, and such minor adjustments in gas composition made as required to line out with this catalyst at about the same yield and with a melt index of 0.8, the polymer product has an NVR of 2.55–2.60 and readily processes into milk bottles on conventional equipment. There is no evidence of reactor fouling.

EXAMPLE G

An attempt was made to essentially repeat Example III of U.S. Pat. No. 4,232,140 using the laboratory gas-phase polymerization method described above with Ort's catalyst and CFCl$_3$ promoter, operating the equipment continuously 24 hours a day. After two days, and before the reaction had lined out sufficiently to get a good sample of the desired product for comparison with the products made by the catalysts of this invention, the reactor became inoperable. After the reaction system had been shut down, the reactor was opened. The reactor walls and distribution plate were found to be fouled (coated with polymer) to the extent that normal fluidization could not be maintained.

The reactor was thoroughly cleaned, and the attempt repeated. This time, the reactor "fouled out" in about one day. A third attempt to run this catalyst and CFCl₃ promoter on a continuous basis was similarly unsuccessful. This example shows that long term operability of a gas-phase fluidized bed depends upon proper choice of catalyst and promoter.

EXAMPLE VIII

A commercial gas-phase fluidized-bed polymerization is carried out in a polymerization system in which the reaction zone is 3.6 m in diameter and about 15 m tall. Recycle gas rate is sufficient to give a gas velocity in the bed of about 30 cm/sec. The polymerization is conducted at 3.5 MPa pressure and 93 degrees C average bed temperature. The catalyst has the same formulation as in Example E, but is made in commercial batches of 450 kg each.

The polymer, produced at a rate of about 8.5 metric tons per hour, from a recycle gas consisting essentially of ethylene, hydrogen, nitrogen, and chloroform, is a blow-molding grad, has an average melt index of 0.8, an average density of 0.964, and an NVR of 2.60 plus or minus 0.05. The product, after compounding with suitable stabilizers, is easily blown into commercially-acceptable 1-gallon milk bottles on conventional milk-bottle blowing equipment. After a 1-month campaign producing this product, there is no evidence of reactor fouling.

Similar results in the narrowing of the molecular weight distribution of ethylene polymers are obtained when the examples are repeated except that the catalyst components, component proportions, comonomers, comonomer proportions, and/or polymerization conditions specified in the examples are replaced with other catalyst components, component proportions, comonomers, comomoner proportions, and/or polymerization conditions taught to be their equivalent in the specification.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A process of polymerizing a monomer charge comprising ethylene comprising the steps of:
   (a) drying an inorganic oxide selected from the group consisting of silica, alumina, magnesia, and mixtures thereof, having surface hydroxyl groups to form a support that is substantially free of adsorbed water;
   (b) reacting the surface hydroxyl groups of the support with at least about 0.5 mol, per mol or surface hydroxyl groups, of at least one organometallic compound corresponding to the formula $R_xAlR'_yR''_z$, wherein R is an alkyl group containing 1 to 12 carbon atoms, R' and R'' are independently selected from the group consisting of H, and alkyl and alkoxy groups containing 1 to 12 carbon atoms, x has a value of 1 to 3, and y and z each can have a value of 0 to 2 and the sum of y and z is not greater than $3-x$, to provide a treated support;
   (c) reacting the thus-treated support with from about 0.001 to about 3 molar proportion, per mol of organometallic compound, of a vanadium component consisting essentially of a mixture of about 10–90 mol percent of $VOCl_3$ and, correspondingly, about 90–10 mol percent of $VCl_4$;
   (d) contacting in a gas-phase reaction zone containing a trialkylaluminum the catalyst product of step (c) with a monomer charge comprising ethylene to produce a polymerized monomer with a predictable intermediate molecular weight distribution.

2. The process of claim 1 wherein the proportion of $VCl_4$ in the vanadium component is 10–50 mol percent to produce a polymerized monomer having an intermediate molecular weight distribution.

3. The process of claim 1 additionally comprising feeding triethylaluminum into the gas-phase reaction zone.

4. The process of claim 1 wherein said monomer charge additionally comprises chloroform.

5. The process of claim 1 wherein said monomer charge additionally comprises hydrogen.

6. The process of claim 1 wherein said monomer charge additionally comprises at least one alpha-olefin containing 3 to 8 carbon atoms.

7. The process of claim 1 additionally comprising drying the product of step (c) prior to said contacting step.

8. The process of claim 1 wherein said inorganic oxide of step (a) is dried to from about 100° to about 1000° C. until substantially all water is removed, and subsequently cooling prior to step (b) said dried inorganic oxide to ambient temperature.

9. The process of claim 1 wherein the organometallic compound is a trialkylaluminum.

10. The process of claim 9 wherein the trialkylaluminum is triethylaluminum.

11. The process of claim 10 wherein the vanadium component contains at least about 40 mol percent of $VCl_4$.

12. The process of claim 1 wherein the amount of materials employed are such as to provide, as starting materials, from about 5 to about 30 mols of organometallic compound per mol of vanadium compound.

13. The process of claim 1 wherein the organometallic compound is employed in an amount such as to provide at least about one mol of organometallic compound per mol of surface hydroxyl groups.

14. The process of claim 1 wherein the amount of organometallic compound reacting with the surface hydroxyl groups of the support is the substantially stoichiometric amount.

15. The process of claim 1 additionally comprising varying the proportion of $VCl_4$ in the vanadium component in order to control in a substantially linear relationship the predictable intermediate molecular weight distribution of the produced polymerized monomer.

16. The process of claim 1 additionally comprising removing particulate substantially polymerized monomer particles from the reaction zone having a predictable intermediate molecular weight distribution.

17. The process of claim 16 additonally comprising recycling unreacted monomer charge from the top of the reaction zone to the bottom of the reaction zone.

18. A process of polymerizing a monomer charge including ethylene comprising the steps of:
   (a) drying an inorganic oxide selected from the group consisting of silica, alumina, magnesia, and mixtures thereof, having surface hydroxyl groups to form a support that is substantially free of adsorbed water;

(b) reacting the surface hydroxyl groups of the support with at least about 0.5 mol, per mol of surface hydroxyl groups, of at least one organometallic compound corresponding to the formula $R_xAlR'_yR''_z$, wherein R is an alkyl group containing 1 to 12 carbon atoms, R' and R'' are independently selected from the group consisting of H, and alkyl and alkoxy groups containing 1 to 12 carbon atoms, x has a value of 1 to 3, and y and z each can have a value of 0 to 2 and the sum of y and z is not greater than $3-x$, to provide a treated support;

(c) reacting the thus-treated support with from about 0.001 to about 3 molar proportion, per mol of organometallic compound, of a vanadium component consisting essentially of a mixture of about 10–90 mol percent of $VOCl_3$, and, correspondingly, about 90–10 mol percent of $VCl_4$, to produce a catalyst product;

(d) contacting in a gas-phase reaction zone containing a trialkylaluminum, without washing the catalyst product of step (c), the catalyst product with a monomer charge comprising ethylene to produce a high yield polymerized monomer with a predictable intermediate molecular weight distribution and a normalized viscosity ratio which is between the normalized viscosity ratio of a polymerized monomer charge resulting from contacting the monomer charge with a catalyst product produced by reacting the thus-treated support of step (b) with $VOCl_3$ alone and the normalized viscosity ratio of a polymerized monomer charge resulting from contacting the monomer charge with a catalyst product produced by reacting the thus-treated support of step (b) with $VCl_4$ alone.

19. The process of claim 18 wherein the proportion of $VCl_4$ in the vanadium component is 10–50 mol percent to produce a polymerized monomer having an intermediate molecular weight distribution.

20. The process of claim 19 comprising reacting the thus-treated support with from about 0.07 to about 0.125 molar proportion, per mol of triethylaluminum, of a vanadium component consisting essentially of a mixture of about 50 mol percent of $VOCl_3$ and, correspondingly, about 50 mol percent of $VCl_4$, wherein said normalized viscosity ratio of said produced polymerized monomer is between the normalized viscosity ratio of a polymerized monomer charge resulting from contacting the monomer charge with a catalyst product produced by reacting the thus-treated support of step (b) with from about 0.07 to about 0.125 molar proportion, per mol of triethylaluminum, of $VOCl_3$ alone, and the normalized viscosity ratio of a polymerized monomer charge resulting from contacting the monomer charge with a catalyst product produced by reacting the thus-treated support of step (b) with from about 0.03 to about 0.06 molar proportion, per mol of triethylaluminum, of $VCl_4$ alone.

21. The process of claim 20 wherein said molar proportion, per mol of triethylaluminum, of $VOCl_3$ and said per molar proportion, per mol of triethylaluminum, of $VCl_4$, are each per 1 g. of silicon dioxide support means.

22. The process of claim 20 wherein said per molar proportion, per mol of triethylaluminum, of $VOCl_3$ and said per molar proportion, per mol of triethylaluminum, of $VCl_4$, are each per 1 g. of silicon dioxide support means, and wherein the monomer charge contacted with a catalyst product produced by reacting the thus-treated support of step (b) with the $VOCl_3$ alone has the larger normalized viscosity ratio and wherein the difference in the normalized viscosity ratio of the polymerized monomer charge produced from contacting the catalyst product produced by reacting the thus-treated support of step (b) with the $VOCl_3$ alone and the normalized viscosity ratio of the polymerized monomer charge produced from contacting the catalyst product produced by reacting the thus-treated support of step (b) with the $VCl_4$ alone is about 0.50 or less.

23. The process of claim 18 additionally comprising feeding triethylaluminum into the gas-phase reaction zone.

24. The process of claim 18 wherein said monomer charge additionally comprises chloroform.

25. The process of claim 18 wherein said monomer charge additionally comprises hydrogen.

26. The process of claim 18 wherein said monomer charge additionally comprises at least one alpha-olefin containing 3 to 8 carbon atoms.

27. The process of claim 18 additionally comprising drying the product of step (c) prior to said contacting step.

28. The process of claim 18 wherein said inorganic oxide of step (a) is dried from about 100° to about 1000? C. until substantially all water is removed, and subsequently cooling prior to step (b) said dried inorganic oxide to ambient temperature.

29. The process of claim 18 wherein the organometallic compound is a trialkylaluminum.

30. The process of claim 29 wherein the trialkylaluminum is triethylaluminum.

31. The process of claim 30 wherein the vanadium component contains at least about 40 mol percent of $VCl_4$.

32. The process of claim 18 wherein the amount of materials employed are such as to provide, as starting materials, from about 5 to about 30 mols of organometallic compound per mol of vanadium compound.

33. The process of claim 18 wherein the organometallic compound is employed in an amount such as to provide at least about one mol of organometallic compound per mol of surface hydroxyl groups.

34. The process of claim 18 wherein the amount of organometallic compound reacting with the surface hydroxyl groups of the support is the substantially stoichiometric amount.

35. The process of claim 18 additionally comprising varying the proportion of $VCl_4$ in the vanadium component in order to control in a substantially linear relationship the predictable intermediate molecular weight distribution of the produced polymerized monomer.

36. The process of claim 18 additionally comprising removing particulate substantially polymerized monomer particles from the reaction zone having a predictable intermediate molecular weight distribution.

37. The process of claim 36 additionally comprising recycling unreacted monomer charge from the top of the reaction zone to the bottom of the reaction zone.

38. A process of polymerizing a monomer charge comprising ethylene comprising the steps of:

(a) drying a silicon dioxide support means having surface hydroxyl groups to form a support that is substantially free of adsorbed water;

(b) reacting the surface hydroxyl groups of the support with at least about 0.5 mol, per mol of surface hydroxyl groups, of triethylaluminum, to provide a treated support;

(c) reacting the thus-treated support with from about 0.001 to about 3 molar proportion, per mol of triethylaluminum, of a vanadium component consisting essentially of a mixture of about 10–90 mol percent of $VOCl_3$ and, correspondingly, about 90–10 mol percent of $VCl_4$;

(d) contacting in a gas-phase reaction zone containing a trialkylaluminum, without having washed the catalyst product of step (c), the catalyst with a monomer charge comprising ethylene to produce a high yield polymerized monomer with a predictable intermediate molecular weight distribution and a normalized viscosity ratio which is between the normalized viscosity ratio of a polymerized monomer charge resulting from contacting the monomer charge with a catalyst product produced by reacting the thus-treated support of step (b) with $VOCl_3$ alone and the normalized viscosity ratio of a polymerized monomer charge resulting from contacting the monomer charge with a catalyst product produced by reacting the thus-treated support of step (b) with $VCl_4$ alone.

39. The process of claim 38 comprising reacting the thus-treated support with between about 0.07 to about 0.125 molar proportion, per mol of triethylaluminum, of a vanadium component consisting essentially of a mixture of about 50 mol percent of $VOCl_3$ and, correspondingly, about 50 mol perecent of $VCl_4$ such that said normalized viscosity ratio of said produced polymerized monomer is between the normalized viscosity ratio of a polymerized monomer charge resulting from contacting the monomer charge with a catalyst product produced by reacting the thus-treated support of step (b) with between about 0.07 to about 0.125 molar proportion, per mol of triethylaluminum, of $VOCl_3$ alone, and the normalized viscosity ratio of a polymerized monomer charge resulting from contacting the monomer charge with a catalyst product produced by reacting the thus-treated support of step (b) with between about 0.03 to bout 0.06 molar porportion, per mol of triethylaluminum, of $VCl_4$ alone.

40. The process of claim 39 wherein said per molar proportion, per mol of triethylaluminum, of $VOCl_3$ and said per molar proportion, per mol of triethylaluminum, of $VCl_4$, are each per 1 g. of silicon dioxide support means.

41. The process of claim 39 wherein said per molar proportion, per mol of trrethylaluminum, of $VOCl_3$ and said per molar proportion, per mol of triethylaluminum, of $VCl_4$, are each per 1 g. of silicon dioxide dioxide support means, and wherein the monomer charge contacted with a catalyst product produced by reacting the thus-treated support of step (b) with the $VOCl_3$ alone has the larger normalized viscosity ratio and the difference in the normalized viscosity ratio and the difference in the normalized viscosity ratio of the polymerized monomer charge produced from contacting the catalyst product produced by reacting the thus-treated support of step (b) with the $VOCl_3$ alone and the normalized viscosity ratio of the polymerized monomer charge produced from contacting the catalyst product produced by reacting the thus-treated support of step (b) with the $VCl_4$ alone is about 0.50 or less.

42. The process of claim 38 wherein the proportion of $VCl_4$ in the vanadium component is 10–50 mol percent to produce a polymerized monomer having an intermediate molecular weight distribution.

43. The process of claim 42 comprising reacting the thus-treated support with from about 0.07 to about 0.125 molar proportion, per mol of triethylaluminum, of a vanadium component consisting essentially of a mixture of about 50 mol percent of $VOCl_3$ and, correspondingly, about 50 mol percent of $VCl_4$, wherein said normalized viscosity ratio of said produced polymerized monomer is between the normalized viscosity ratio of a polymerized monomer charge resulting from contacting the monomer charge with a catalyst product produced by reacting the thus-treated support of step (b) with from about 0.07 to about 0.125 molar proportion, per mol of triethyaluminu, of $VOCl_3$ alone, and the normalzied viscosity ratio of a polymerized monomer charge resulting from contacting the monomer charge with a catalyst product produced by reacting the thus-treated support of step (b) with from about 0.03 to about 0.06 molar proportion, per mol of triethylaluminum, of $VCl_4$ alone.

44. The process of claim 43 wherein said per molar proportion, per mol of triethylaluminum, of $VOCl_3$ and said per molar proportion, per mol of triethylaluminum, of $VCl_4$, are each per 1 g. of silicon dioxide support means.

45. The process of claim 43 wherein said per molar proportion, per mol of treithylaluminum, of $VOCl_3$ and said per molar porportion, per mol of triethylaluminum, of $VCl_4$, are each per 1 g. of silicon dioxide support means, and wherein the monomer charge contacted with a catalyst product produced by reacting the thus-treated support of step (b) with the $VOCl_3$ alone has the larger normalized viscosity ratio and wherein the difference in the normalized viscosity ratio of the polymerized monomer charge produced from contacting the catalyst product produced by reacting the thus-treated support of step (b) with the $VOCl_3$ alone and the normalized viscosity ratio of the polymerized monomer charge produced from contacting the catalyst product produced by reacting the thus-treated support of step (b) with the $VCl_4$ alone is about 0.50 or less.

46. The process of claim 45 additionally comprising feeding triethylaluminum into the gas-phase reaction zone.

47. The process of claim 46 wherein said monomer charge additionally comprises chloroform.

48. The process of claim 47 wherein said monomer charge additionally comprises hydrogen.

49. The process of claim 48 wherein said monomer charge additionally comprises at least one alpha-olefin contain 3 to 8 carbon atoms.

50. The process of claim 49 additionally comprising drying the product of step (c) prior to said contacting step.

51. The process of claim 49 wherein said inorganic oxide of step (a) is dried to from about 100° to about 1000° C. until substantially all water is removed, and subsequently cooling prior to step (b) said dried inorganic oxide to ambient temperature.

52. The process of claim 38 additionally comprising varying the proportion of $VCl_4$ in the vanadium component in order to control in a substantially linear relationship the predictable intermediate molecular weight distribution of the produced polymerized monomer.

53. The process of claim 38 additionally comprising removing particulate substantially polymerized monomer particles from the reaction zone having a predictable intermediate molecular weight distribution.

54. The process of claim 53 additionally comprising recycling unreacted monomer charge from the top of the reaction zone to the bottom of the reaction zone.

55. A process of polymerizing a monomer charge comprising ethylene, hydrogen and chloroform, comprising the steps of:
(a) drying a silicon dioxide support means having surface hydroxyl groups to form a support that is substantially free of adsorbed water;
(b) reacting the surface hydroxyl groups of the support with at least about 0.5 mol, per mol of surface hydroxyl groups, of triethylaluminum, to provide a treated support;
(c) reacting the thus-treated support from about 0.07 to about 0.125 molar proportion, per mol of triethylaluminum, of a vanadium component consisting essentially of a mixture of about 50 mol percent of $VOCl_3$ and, correspondingly, about 50 mol percent of $VCl_4$;
(d) contacting in a gas-phase reaction zone, without washing the catalyst product of step (c), the catalyst product with a monomer charge comprising ethylene, hydrogen, and chloroform to produce a high yield polymerized monomer with a predictable intermediate molecular weight distribution and a normalized viscosity ratio which is between the normalized viscosity ratio of a polymerized monomer charge resulting from contacting the monomer charge with a catalyst product produced by reacting the thus-treated support of step (b) with from about 0.07 to about 0.125 molar proportion, per mol of triethylaluminum, of $VOCl_3$ alone, and the normalized viscosity ratio of a polymized monomer charge resulting from contacting the monomer charge with a catalyst product by reacting the thus-treated support of step (b) with from about 0.03 to about 0.06 molar proportion, per mol of triethylaluminum, of $VCl_4$ alone, and wherein the difference in the normalized viscosity ratio of the polymerized monomer charge produced from contacting the catalyst product produced by reacting the thus-treated support of step (b) with the $VOCl_3$ alone and the normalized viscosity ratio of the polymerized monomer charge produced from contacting the catalyst product produced by reacting the thus-treated support of step (b) with $VCl_4$ alone is about 0.50 or less, with the $VOCl_3$ alone having the larger normalized viscosity ratio;
(e) feeding triethylaluminum into the gas-phase reaction zone;
(f) varying the proportion of $VCl_4$ in the vanadium component in order to control in a substantially linear realtionship the predictable intermediate molecular weight distribution of the produced polymerized monomer; and
(g) removing a high yield polymerized monomer from the reaction zone having a predictable intermediate molecular weight distribution.

56. The process of claim 55 wherein the propportion of $VCl_4$ in the vanadium component is from 10 mol percent to less than about 50 mol percent to produce a polymerized monomer having an intermediate molecular weight distribution.

57. The process of claim 55 additionally comprising recycling unreacted monomer charge from the top of the reaction zone to the bottom of the reaction zone.

58. A process of polymerizing a monomer charge comprising chloroform, ethylene, and hydrogen in a gas-phase, fluidized-bed reaction zone which comprises a bed of particulate substantially polymerized ethylene particles and is under operating conditions for polymerizing ethylene using the monomer charge, said process comprising the steps of:
(a) drying at from about 100° C. to about 1000° C. an inorganic oxide selected from the group consisting of silica, alumina, magnesia, and mixtures thereof, having surface hydroxyl groups to form a support that is substantially free of adsorbed water;
(b) cooling the dried inorganic oxide of step (a) to ambient temperature;
(c) reacting the surface hydroxyl groups of the support with at least about 0.5 mol, per mol of surface hydroxyl groups, of at least one organometallic compound corresponding to the formula $R_xAlR'_yR''_z$, wherein R is an alkyl group containing 1 to 12 carbon atoms, R' and R'' are independently selected from the group consisting of H, andalkyl and alkoxy groups containing 1 to 12 carbon atoms, x has a value of 1 to 3, and y and z each can have a value of 0 to 2 and the sum of y and z is not greater than $3-x$, to provide a treated support;
(d) reacting the thus-treated support with from about 0.001 to about 3 molar proportion, per mol of organometallic compound, of a vanadium component consisting essentially of a mixture of about 10–90 mol percent of $VOCl_3$ and, correspondingly, about 90–10 mol percent of $VCl_4$;
(e) drying the product of step (d);
(f) feeding the product of step (e) into a gas-phase reaction zone in order to form part of the bed in the fluidized-bed reaction zone;
(g) feeding, separately and independently of said feeding step (f), into the gas-phase reaction zone triethylaluminum such that such bed in the gas-phase reaction zone comprises the product of step (f), triethylaluminum, and particulate substantially polymerized etylene particles;
(h) fluidizing the bed of step (g) at a temperature from about 50° C. to about 120° C. by introducing into the reaction zone a gas mixture comprising ethylene, hydrogen, and chloroform;
(i) removing particulate substantially polymerized ethylene particles from the reaction zone having a predictable intermediate molecular weight distribution; and
(j) recycling unreacted gas mixture of step (h) from the top of the reaction zone, through a heat exchanger means, and into the bottom of the reaction zone.

59. A process of polymerizing a monomer charge comprising an alpha olefin, chloroform, ethylene, and hydrogen in a gas-phase, fluidized-bed reaction zone which comprises a bed of particulate substantially polymerized ethylene particles and is under operating conditions for polymerizing ethylene using the monomer charge, said process comprising the steps of:
(a) drying at from about 100° C. to about 1000° C. an inorganic oxide selected from the group consisting of silica, alumina, magnesia, and mixtures thereof, having surface hydroxyl groups to form a support that is substantially free of adsorbed water;
(b) cooling the dried inorganic oxide of step (a) to ambient temperatures;

(c) reacting the surface hydroxyl groups of the support with at least about 0.5 mol, per mol of surface hydroxyl groups, of at least one organo-metallic compound corresponding to the formula $R_xAlR'_yR''_z$, wherein R is an alkyl group containing 1 to 12 carbon atoms, R' and R" are independently selected from the group consisting of H, and alkyl and alkoxy groups containing 1 to 12 carbon atoms, x has a value of 1 to 3, and y and z each can have a value of 0 to 2 and the sum of y and z is not greater than 3−x, to provide a treated support;

(d) reacting the thus-treated support with from about 0.001 to about 3 molar proportion, per mol of organometallic compound, of a vanadium component consisting essentially of a mixture of about 10–90 mol percent of $VOCl_3$ and, correspondingly, about 90–10 mol percent of $VCl_4$;

(e) drying the product of step (d);

(f) feeding, the product of step (e) into a gas-phase reaction zone in order to form part of the bed in the fluidized-bed reaction zone;

(g) feeding, separately and independently of said feeding step (f), into the gas-phase reaction zone triethylaluminum such that such bed in the gas-phase reaction zone comprises the product of step (f), triethylaluminum and particulate substantially polymerized ethylene particles;

(h) fluidizing the bed of step (g) at a temperature from about 50° C. to about 120° C. by introducing into the reaction zone a gas mixture comprising ethylene, hydrogen, an alpha olefin, and chloroform;

(i) removing particulate substantially polymerized ethylene particles from the reaction zone having a predictable intermediate molecular weight distribution; and (j) recycling unreacted gas mixture of step (h) from the top of the reaction zone, through a heat exchanger means, and into the bottom of the reaction zone.

* * * * *